US010941473B2

(12) United States Patent
Snyder et al.

(10) Patent No.: US 10,941,473 B2
(45) Date of Patent: Mar. 9, 2021

(54) ALUMINUM ALLOYS

(71) Applicant: QUESTEK INNOVATIONS LLC, Evanston, IL (US)

(72) Inventors: David R. Snyder, Des Plaines, IL (US); James Saal, Chicago, IL (US); Jason T. Sebastian, Chicago, IL (US); Gregory B. Olson, Riverwoods, IL (US); Jiadong Gong, Evanston, IL (US)

(73) Assignee: QUESTEK INNOVATIONS LLC, Evanston, IL (US)

( * ) Notice: Subject to any disclaimer, the term of this patent is extended or adjusted under 35 U.S.C. 154(b) by 348 days.

(21) Appl. No.: 15/757,163

(22) PCT Filed: Sep. 2, 2016

(86) PCT No.: PCT/US2016/050221
§ 371 (c)(1),
(2) Date: Mar. 2, 2018

(87) PCT Pub. No.: WO2017/041006
PCT Pub. Date: Mar. 9, 2017

(65) Prior Publication Data
US 2018/0245190 A1    Aug. 30, 2018

Related U.S. Application Data

(60) Provisional application No. 62/214,056, filed on Sep. 3, 2015.

(51) Int. Cl.
*C22F 1/053* (2006.01)
*C22C 21/06* (2006.01)
(Continued)

(52) U.S. Cl.
CPC .............. *C22F 1/053* (2013.01); *B22F 10/20* (2021.01); *B33Y 10/00* (2014.12); *B33Y 70/00* (2014.12);
(Continued)

(58) Field of Classification Search
CPC ......... C22F 1/053; B33Y 10/00; B33Y 70/00; C22C 21/02; C22C 21/06; C22C 21/10
See application file for complete search history.

(56) References Cited

U.S. PATENT DOCUMENTS 4,668,290 A     3/1987  Wang et al.
4,711,762 A  *  12/1987  Vernam .................. C22C 21/10
                                                                148/415

(Continued)

FOREIGN PATENT DOCUMENTS

CN          107234240 A      10/2017
EP          3034639 A1       6/2016
(Continued)

OTHER PUBLICATIONS

Robinson et al ("The influence of quench sensitivity on residual stresses in the aluminum alloys 7010 and 7075", Materials Characterization, Elsevier, New York, NY, US, vol. 65, 6, Jan. 2002, pp. 73-85 (Year: 2002).*

(Continued)

*Primary Examiner* — Christopher S Kessler
*Assistant Examiner* — Jiangtian Xu
(74) *Attorney, Agent, or Firm* — Michael Best & Friedrich LLP

(57) ABSTRACT

Aluminum alloys are provided. The alloys can include one or more of zinc, magnesium, copper, zirconium, yttrium, erbium, ytterbium, scandium, silver, and the balance of aluminum and incidental elements and impurities. The (Continued)

alloys can be used for additive manufacturing of various articles, such as aircraft components.

22 Claims, 14 Drawing Sheets

(51) Int. Cl.
    C22C 21/10     (2006.01)
    C22F 1/047     (2006.01)
    C22C 21/02     (2006.01)
    B22F 10/20     (2021.01)
    B33Y 10/00     (2015.01)
    B33Y 70/00     (2020.01)
    C22C 1/04     (2006.01)
    B23K 26/342     (2014.01)

(52) U.S. Cl.
    CPC .............. *C22C 21/02* (2013.01); *C22C 21/06* (2013.01); *C22C 21/10* (2013.01); *C22F 1/047* (2013.01); *B22F 2301/052* (2013.01); *B23K 26/342* (2015.10); *C22C 1/04* (2013.01)

(56) References Cited

U.S. PATENT DOCUMENTS

| | | | |
|---|---|---|---|
| 4,861,391 A | | 8/1989 | Rioja et al. |
| 4,874,440 A | * | 10/1989 | Sawtell .................. C22F 1/04 148/437 |
| 2004/0089382 A1 | | 5/2004 | Senkov et al. |
| 2006/0013719 A1 | | 1/2006 | Ichikawa et al. |
| 2009/0263266 A1 | | 10/2009 | Pandey |
| 2010/0143177 A1 | | 6/2010 | Pandey |
| 2011/0044843 A1 | | 2/2011 | Misra et al. |
| 2013/0312877 A1 | | 11/2013 | Chakrabarti et al. |
| 2014/0230974 A1 | * | 8/2014 | Lin et al. ................ C22F 1/047 148/695 |
| 2014/0271322 A1 | | 9/2014 | Godfrey et al. |
| 2016/0222493 A1 | | 8/2016 | Saikawa et al. |
| 2016/0228950 A1 | | 8/2016 | Bodily et al. |
| 2017/0314109 A1 | | 11/2017 | McCloskey |
| 2018/0010216 A1 | | 1/2018 | Vo et al. |

FOREIGN PATENT DOCUMENTS

| | | |
|---|---|---|
| JP | 2011-021218 A | 2/2011 |
| JP | 2015-071823 A | 4/2015 |
| JP | 2017-155291 A | 9/2017 |
| JP | 2018-510174 A | 9/2020 |
| WO | 2014/071135 A1 | 5/2014 |
| WO | 2014/144630 A1 | 9/2014 |
| WO | 2014196987 A2 | 12/2014 |
| WO | 2016/199564 A1 | 12/2016 |
| WO | 2017/041006 A1 | 3/2017 |

OTHER PUBLICATIONS

Desmukh et al "Effect of aging treatments on the kinetics of fatigue crack growth in 7010 aluminum alloy", Materials Science and Engineering: A, Elsevier, Amsterdam, NL, vol. 435-436, Nov. 5, 2006, pp. 318-326 (Year: 2006).*

Roenning et al "Constitutive relationships for AlZnMg, AlZnMgCr, and AlZnMgZr alloys", Metallurgical and Materials Transactions A, Mar. 2001, 32:769-776. (Year: 2001).*

"Roenning et al., ""Constitutive Relationships for AlZnMg, AlZnMgCr, andAlZnMgZr Alloys,"" Metallurgical and Materials Transactions A, Mar. 2001, 32:769-776".

Extended European Search Report for Application No. 16843115.3 dated Sep. 26, 2019 (9 pages).

Bartkowiak et al., "New Developments of Laser Processing Aluminium Alloys via Additive Manufacturing Technique," Physics Procedia, 2011, 12:393-401.

Fulcher et al., "Comparison of ALSI10MG and AL6061 processed through DMLS," Proceedings of the Solid Freeform Fabrication (SFF) Symposium, 2014, 404-419.

International Preliminary Report on Patentability for Application No. PCT/US2016/050221 dated Mar. 6, 2018 (7 pages).

International Search Report and Written Opinion for Application No. PCT/US2016/050221 dated Nov. 22, 2016 (12 pages).

Reschetnik et al., "Fatigue crack growth behavior and mechanical properties of additively processed EN AW-7075 aluminium alloy," Procedia Structural Integrity, 2016, 2:3040-3048.

Desmukh et al., "Effect of aging treatments on the kinetics of fatigue crack growth in 7010 aluminum alloy" Materials Science and Engineering, vol. 435-436, pp. 318-326, Nov. 5, 2006.

Robinson et al., "The influence of quench sensitivity on residual stresses in aluminum alloys 7010 and 7075" Materials Characterization, vol. 65, pp. 73-85, Jan. 6, 2012.

Extended European Search Report for Application No. 16843115. 3-1108 dated Jun. 17, 2019 (10 pages).

International Search Report and Written Opinion for Application No. PCT/US2018/062761 dated Feb. 7, 2019 (15 pages).

International Search Report and Written Opinion for Application No. PCT/US2018/062779 dated Nov. 1, 2019 (15 pages).

Carpenter Technology, "A Clean Ti: A Gas Atomization Primer," <https://www.carpentertechnology.com/en/alloy-techzone/technical-information/technical-articles/a-clean-ti-a-gas-atomization-primer> webpage available as early as Nov. 13, 2018.

Dietrich et al., "A New Approach for a Flexible Powder Production for Additive Manufacturing," Procedia Manufacturing, 2016, 6: 88-95.

EIGA Systems, "Electrode Induction Melting Inert Gas Atomization Systems for Electrodes up to 150 mm Diameter and 1000 mm Length," <https://www.ald-vt.com/portfolio/engineering/vacuum-metallurgy/electrode-induction-melting-inert-gas-atomization/> webpage available as early as Nov. 13, 2018.

Erasteel, "Powder Metallurgy—ASP," <https://www.erasteel.com/technologies/powder-metallurgy-asp/> webpage available as early as Nov. 13, 2018.

Jones, "Engineering Design Data for Aluminum Alloy 7050-T73651 Plate," Air Force Materials Laboratory, 1973, 37 pages.

VIGA Systems, "Vacuum Induction Melting Inert Gas Atomization Systems for Charge Weights from 5 up to 2500 kg," <https://www.ald-vt.com/portfolio/engineering/vacuum-metallurgy/vacuum-induction-melting-inert-gas-atomization/> webpage available as early as Nov. 13, 2018.

Yuan et al., "Effect of Zr addition on properties of Al—Mg—Si aluminum alloy used for all aluminum alloy conductor," Materials and Design, 2011, 32(8-9): 4195-4200.

Japanese Patent Office Action for Application No. 2018-512158 dated Sep. 28, 2020 (18 pages, English translation included).

* cited by examiner

ALUMINUM ALLOYS

CROSS-REFERENCE TO RELATED APPLICATIONS

This is a U.S. national stage entry of International Patent Application No. PCT/US2016/050221, filed on Sep. 2, 2016, which claims priority to U.S. Application No. 62/214,056, filed on Sep. 3, 2015, the entire contents of all of which are fully incorporated herein by reference.

STATEMENT OF GOVERNMENT INTEREST

This invention was made with government support under Contract Nos. N00014-14-P-1137 and N00014-15-P-0158, awarded by the U.S. Department of Defense. The government has certain rights in this invention.

TECHNICAL FIELD

The present disclosure relates to aluminum alloys, and more particularly, to aluminum alloys for additive manufacturing.

BACKGROUND

Additive manufacturing (AM; also referred to as "3-D Printing") is a process of fabricating components from a powder or liquid base in a layer-by-layer method under the control of computer-aided design (CAD) information. Examples of additive manufacturing processes include stereolithography, selective laser sintering (SLS), direct metal laser sintering (DMLS), electron beam melting (EBM), and laser powder deposition (LPD). By allowing for net-shape fabrication of highly complex geometries without molds or machining, this process offers the potential to reduce material usage, energy consumption, and component cost and fabrication time. Additive manufacturing (AM) allows for rapid component production, one-off production of difficult-to-source parts, and production of parts difficult to produce by conventional means (such as complex geometries that cannot be machined or cast). This allows aircraft original equipment manufacturers considerable flexibility in part manufacturing, and end users in acquiring custom or replacement parts.

SUMMARY

In one aspect, disclosed are aluminum alloys for additive manufacturing. In certain embodiments, the aluminum alloy can solidify with about 10% of non-equilibrium (soluble) eutectic constituents for improved resistance to hot tearing during additive manufacturing processing. In certain embodiments, the eutectic constituents can be dissolved during post-processing operations to restore a substantially single-phase aluminum matrix, which can be free of coarse eutectic constituents that were used for hot tearing resistance. In another aspect, disclosed are methods of manufacturing aluminum alloys. In another aspect, disclosed are articles of manufacture including the aluminum alloys. In another aspect, disclosed are methods of additive manufacturing using the aluminum alloys.

DETAILED DESCRIPTION

Figure 1:
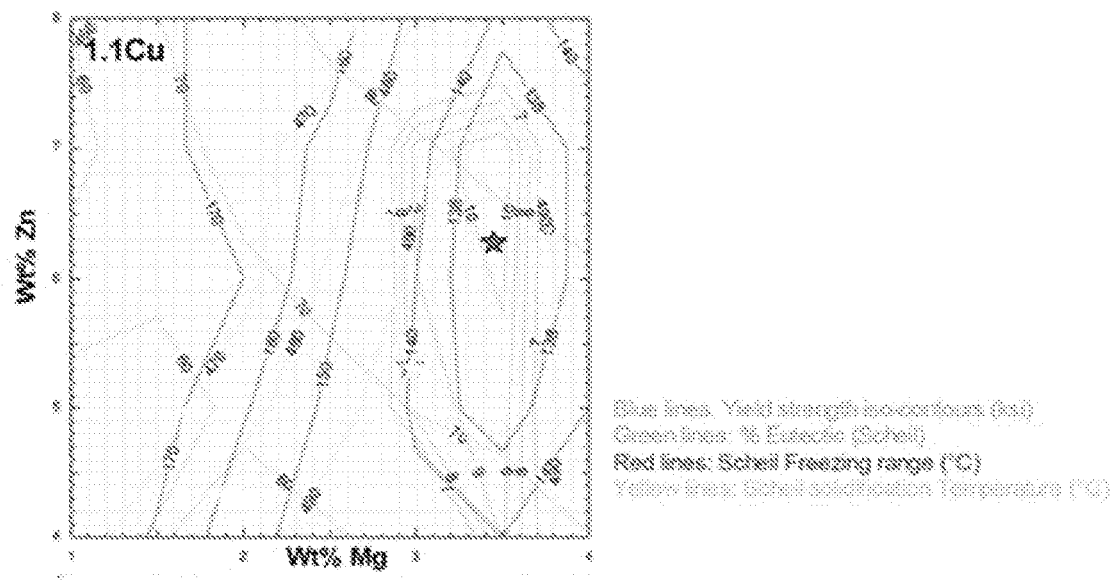
FIG. 1 shows the predicted property iso-contours as a function of the Zn and Mg content of an Al-1.1Cu-xZn-yMg alloy. The star indicates a region of combined strength and hot tearing resistance.

Additive manufacturing processing is characterized by rapid solidification and intense residual stresses, both of which can drive cracking in metals with high coefficient of thermal expansion (which aluminum has) and non-optimal solidification behavior. Hot tearing refers to the cracking that occurs in the final stages of solidification, in which the solid phase is torn apart along the interdendritic liquid films present at the end of solidification. The driving force for hot tearing is the high tensile residual stresses generated by both the thermal contraction in the solid during cooling and the shrinkage induced by the solid-to-liquid transformation. These thermal stresses are further intensified by the rapid solidification of processes such as welding and additive manufacturing.

Unfortunately, high-performance 7xxx-series alloys are optimized for use as wrought alloys and thus lack the resistance to hot tearing necessary for additive manufacturing. For example, high strength Al alloys such as 7075, 7050 and 6061 are highly susceptible to hot tearing under the intense residual stresses of rapid solidification processes, and are difficult or not possible to process by additive manufacturing. This susceptibility has limited the application of these high-strength alloys in additive manufacturing (AM) process development.

Some commercial 7xxx alloys are optimized for hot tearing resistance for weldability (e.g., AA7005, AA7039), but the improved processability of these alloys comes with a significant sacrifice in mechanical properties over structural alloys 7050 and 7075. Other classes of aluminum alloys, such as the Al—Si series casting grades, have been designed to resist hot cracking to allow for use as castings, but the strength of these casting grades is far inferior to the high-strength wrought grade. Hot tear resistance in these alloys is afforded by eutectic reaction during solidification, which improves processability by additive manufacturing but limits the strength of the alloy. The eutectic constituents in these alloys (usually Si) are of considerable fraction and are an equilibrium (insoluble), non-strengthening phase that strongly restricts the achievable strength in these grades.

Given the significant reliance on high strength aluminum in aircraft structural design and the opportunities for applying additive manufacturing to this field, the shortfalls of existing aluminum alloys represent a significant barrier to the application of AM processes to the production of aircraft structural components. This limitation of existing high-strength aluminum alloys presents a unique opportunity to develop a class of high-strength aluminum alloys that can be used in additive manufacturing processing. At a fundamental level, the alloy design balances hot tearing susceptibility risks against the mechanical performance requirements for aircraft structural components.

The hot-tearing resistance of an alloy can be improved by applying the following design constraints, all of which are inter-dependent: 1) maximizing the amount of eutectic formed at the last stages of solidification; 2) minimizing as-built grain size; 3) minimizing the alloy freezing range, 4) maximizing the solidus temperature, and 5) minimizing second-phase precipitation during cooling in the solid-state. This can be accomplished by designing alloys with optimal solidification behavior required for the process, and utilizing eutectic solidification reaction based upon non-equilibrium (soluble) eutectic phases for enhanced additive manufacturing processability. The eutectic constituents are then dissolved during post-AM heat treatment to restore a microstructure similar to high-performance wrought aluminum alloys for enhanced strength. This is a unique combination of behavior and properties not achievable in either conventional wrought or casting processes, making the alloys unique from existing classes of aluminum. Alloy design was performed with integrated computational materials engineering (ICME) tools and the CALPHAD (CALculation of PHAse Diagrams) approach, enabling quantitative prediction of precipitate phase fraction, yield strength, hot tearing index, and Scheil (i.e., non-equilibrium) freezing range for arbitrary alloy compositions. With these tools, alloy compositions were optimized according to the five design criteria described above (and illustrated in FIGS. 1-6).

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

As used herein, "additive manufacturing" may refer to "a process of joining materials to make objects from 3D model data, usually layer upon layer, as opposed to subtractive manufacturing methodologies", as defined in ASTM F2792-12a entitled "Standard Terminology for Additively Manufacturing Technologies". In some embodiments, additive manufacturing may include powder bed technology such as Selective Laser Sintering (SLS), Selective Laser Melting (SLM), and Electron Beam Melting (EBM), among others. Additive manufacturing may also include wire extrusion technologies such as Fused Filament Fabrication (FFF), among others. Suitable additive manufacturing systems include the EOSINT M 280 Direct Metal LaserSintering (DMLS) additive manufacturing system, available from EOS GmbH (Robert-Stirling-Ring 1, 82152 Krailling/Munich, Germany). Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques.

"Aging temperature" as used herein refers to an elevated temperature at which an alloy is kept for heat treatment. Such heat treatment may suitably induce a precipitation reaction. In some embodiments, the heat treatment may be conducted at two distinct temperatures for two distinct times.

As used herein, terms such as $L1_2$ phase and fracture toughness ($K_{Ic}$) include definitions that are generally known in the art such as those found in ASM MATERIALS ENGINEERING DICTIONARY (J. R. Davis ed., ASM International 1992).

"Yield strength" as used herein refers to the stress level at which plastic deformation begins.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. ALUMINUM ALLOYS

Disclosed herein are aluminum alloys. The alloys can have a combination of hot tear resistance and strength, making them amenable to additive manufacturing for production of articles requiring high strength (e.g., aircraft components). In certain embodiments, the alloys may utilize non-equilibrium eutectic solidification phases to deposit material with eutectic (for hot tear resistance), and dissolve eutectic constituents during subsequent post-build processing (for maximum mechanical properties). The alloys may be designed with deliberate oxygen gettering phases to reduce aluminum-oxides into finer, less detrimental oxide structures.

In certain embodiments, the disclosed alloys solidify with about 10% of non-equilibrium (soluble) eutectic constituents for improved resistance to hot tearing during additive manufacturing processing. The eutectic constituents may be completely dissolved during post-AM solution treatment to restore a single-phase aluminum matrix, free of coarse eutectic constituents that were used for hot tearing resistance.

In certain embodiments, the alloys may comprise aluminum, and one or more of zinc, magnesium, copper, and zirconium, along with incidental elements and impurities. The alloys may further comprise yttrium, erbium, ytterbium, scandium, manganese, or silver.

In certain embodiments, the disclosed alloys incorporate $Al_3X$ precipitate phases, where X is Zr, Y, Er, Yb, or Sc. The alloys may incorporate rare earth additions (e.g., Y, Er, Yb, or Sc) to form a reactive dispersion to getter the high oxygen contents inherent to powder-bed AM processes, for refined flaw size and improved toughness and fatigue. In certain embodiments, the disclosed alloys incorporate manganese for iron and silicon gettering. In certain embodiments, the disclosed alloys include silver for enhancing the rate and magnitude of T-phase age hardening.

In certain embodiments, the alloys may comprise, by weight, about 3% to about 9% zinc, about 2% to about 6% magnesium, about 0.5% to about 2% copper, up to about 0.1% zirconium, and the balance of weight percent comprising aluminum and incidental elements and impurities. In certain embodiments, the alloys may further comprise, by weight, up to about 2% yttrium, up to about 2% erbium, up to about 2% ytterbium, up to about 2% scandium, up to about 2% manganese, or up to about 2% silver. In certain embodiments, the alloys may comprise, by weight, about 4% to about 9% zinc, about 0.5% to about 3% magnesium, up to about 0.5% copper, up to about 1% zirconium, and the balance of weight percent comprising aluminum and incidental elements and impurities.

Incidental elements and impurities in the disclosed alloys may include, but are not limited to, silicon, iron, chromium, nickel, vanadium, titanium, or mixtures thereof, and may be present in the alloys disclosed herein in amounts totaling no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.05%, no more than 0.01%, or no more than 0.001%. In certain embodiments, the alloys include no more than 0.2% of Fe and Si each, and no more than 0.05% of other incidentals.

It is understood that the alloys described herein may consist only of the above-mentioned constituents or may consist essentially of such constituents, or in other embodiments, may include additional constituents.

Figure 2:
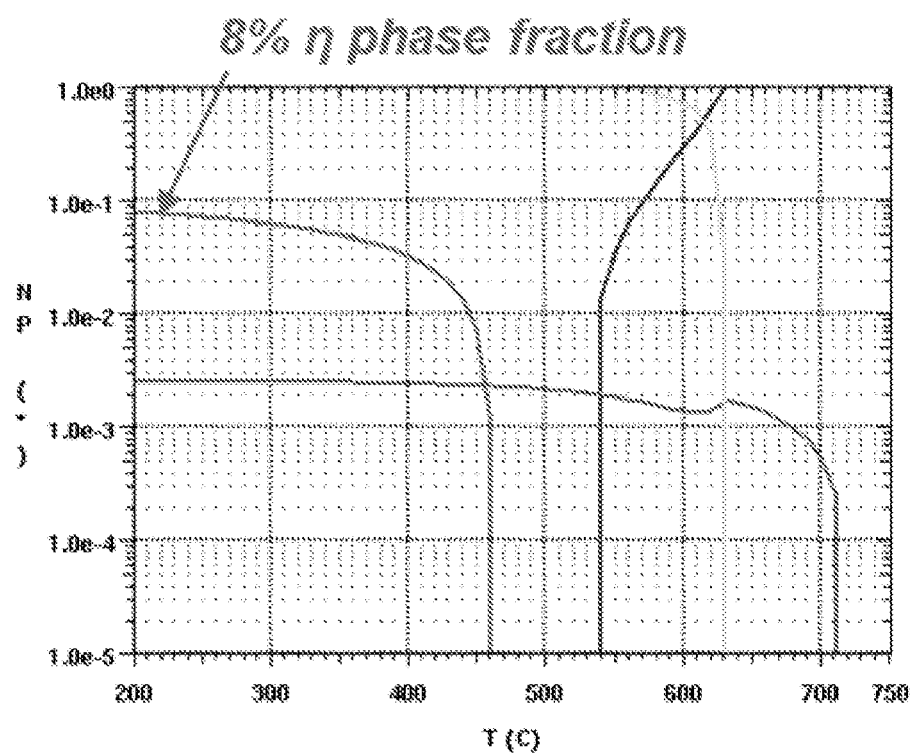
FIG. 2 shows an equilibrium step diagram, calculated using ThermoCalc, of an Al-1.1Cu-6.3Zn-3.2Mg-0.1Zr alloy, showing the stable phases and their respective phase fractions (logarithmic scale) as a function of temperature.
Figure 3:
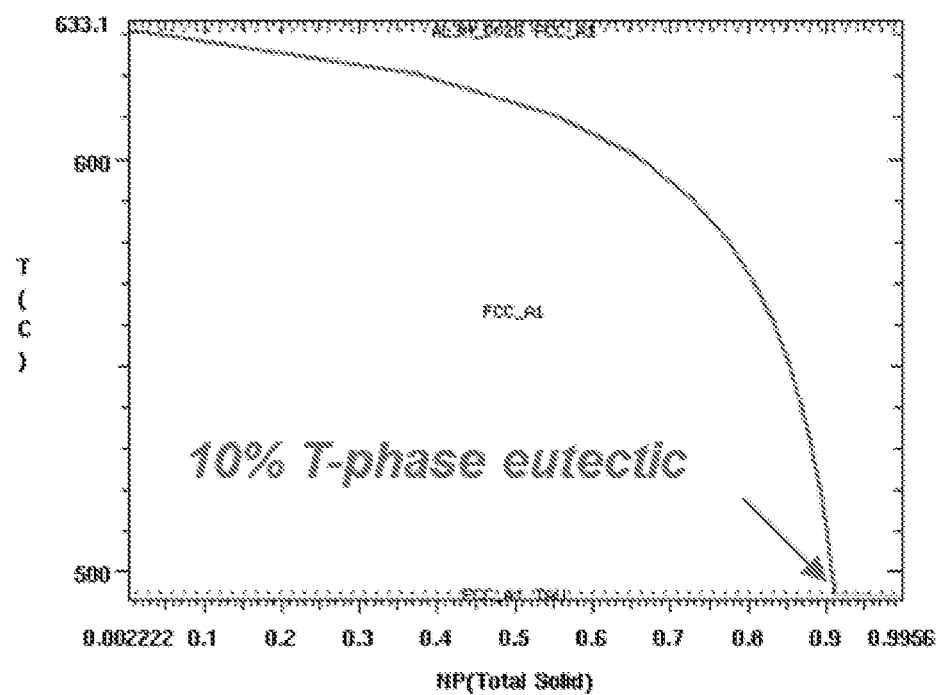
FIG. 3 shows a non-equilibrium solidification profile, calculated using the Scheil model in ThermoCalc, of an Al-1.1Cu-6.3Zn-3.2Mg-0.1Zr alloy, showing the phases that form during solidification (tracked as fraction of solid phase) as a function of temperature.

Series A. Transient T-Phase Eutectic for Hot Tearing Resistance+η'-Phase Precipitate Strengthening In certain embodiments, the disclosed alloys are designed to contain a selected percent of soluble T-phase eutectic for hot tearing resistance, and a selected percent η'-phase precipitated at a selected temperature for high strength. In certain embodiments, as shown in FIGS. 1-3, the disclosed alloys are designed to contain about 10% of soluble T-phase eutectic for hot tearing resistance, and greater than 6% η'-phase, precipitated at about 170° C., for high strength.

In certain embodiments, the alloy comprises, by weight, about 6.3% zinc, about 3.5% magnesium, about 1.1% copper, about 0.1% zirconium, and the balance of weight percent comprising aluminum and incidental elements and impurities. In certain embodiments, the alloy comprises, by weight, about 7.5% zinc, about 4.6% magnesium, about 1.5% copper, about 0.1% zirconium, and the balance of weight percent comprising aluminum and incidental elements and impurities.

In certain embodiments, the disclosed alloys incorporate $Al_3X$ precipitate phases, where X is Zr, Y, Er, Yb, or Sc. The alloys may incorporate rare earth additions (e.g., Y, Er, Yb, or Sc) to form a reactive dispersion to getter the high oxygen contents inherent to powder-bed AM processes, for refined flaw size and improved toughness and fatigue. In certain embodiments, the disclosed alloys incorporate manganese for iron and silicon gettering. In certain embodiments, the disclosed alloys include silver for enhancing the rate and magnitude of T-phase age hardening.

Figure 4:
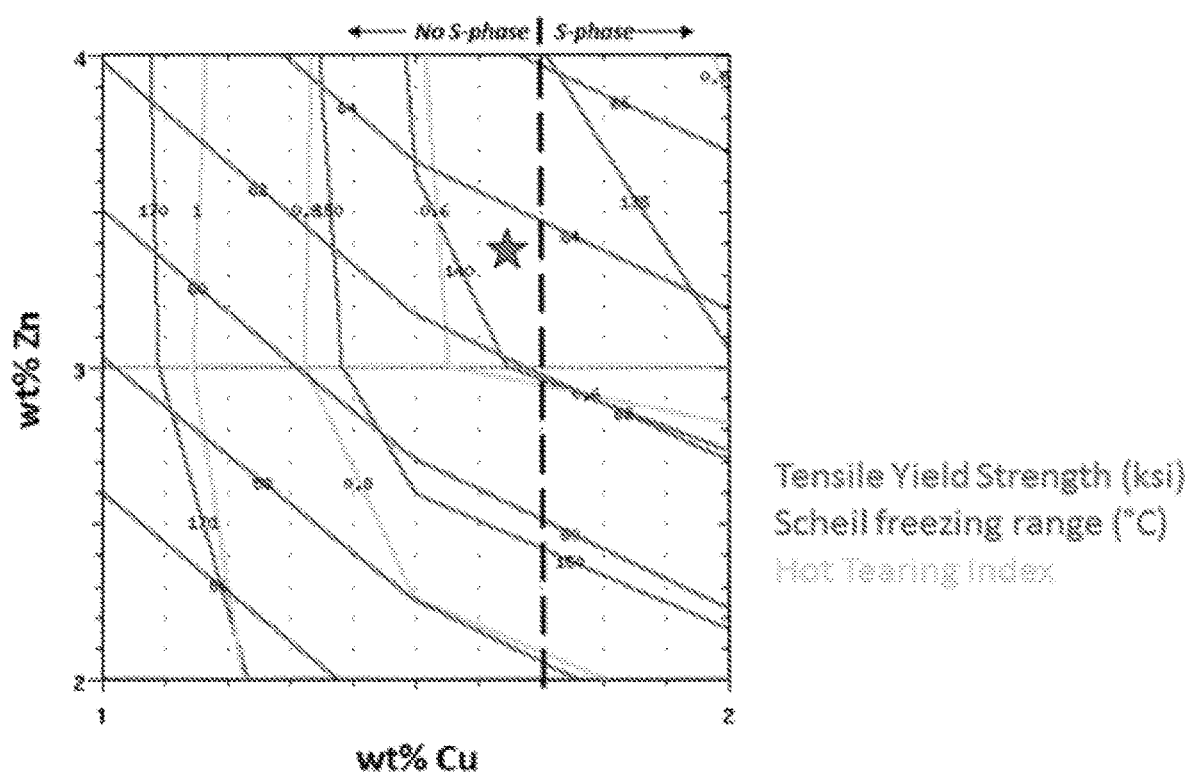
FIG. 4 shows the predicted strength and solidification parameter iso-contours as a function of Zn and Cu content of an Al-5Mg-xCu-yZn alloy. The star indicates a region of combined strength and hot tearing resistance, while maintaining a solution temperature window (in this case, avoidance of S-phase ($Al_2CuMg$) near the solidus temperature)
Figure 5:
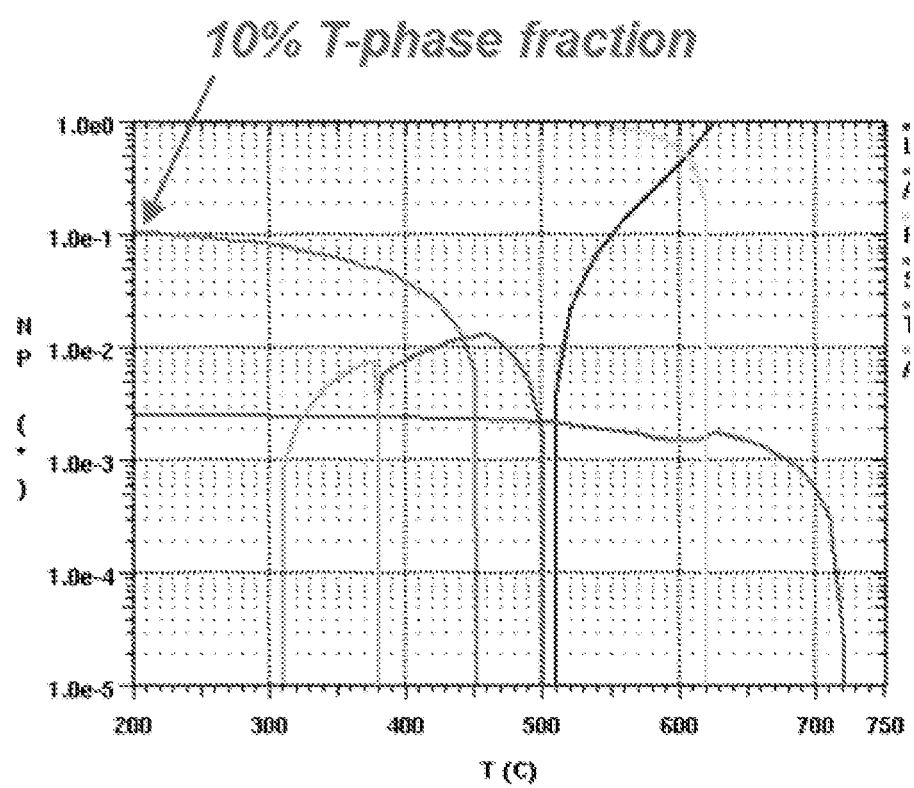
FIG. 5 shows an equilibrium step diagram, calculated using ThermoCalc, of an Al-1.5Cu-3.3Zn-5.5Mg-0.1Zr alloy, showing the stable phases and their respective phase fractions (logarithmic scale) as a function of temperature.
Figure 6:
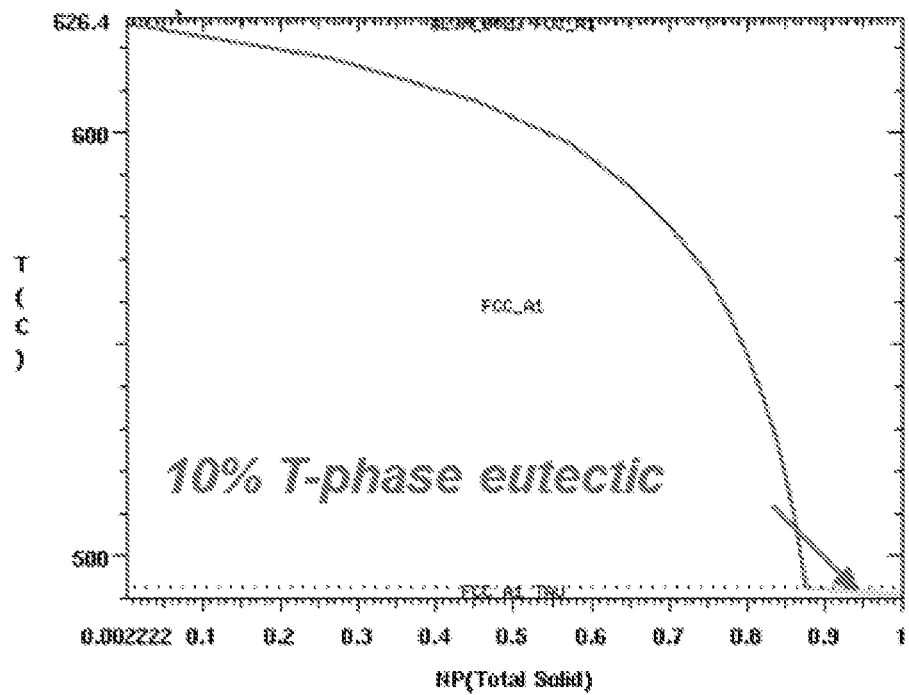
FIG. 6 shows a non-equilibrium solidification profile, calculated using the Scheil model in ThermoCalc, of an Al-1.5Cu-3.3Zn-5.5Mg-0.1Zr alloy, showing the phases that form during solidification (tracked as fraction of solid phase) as a function of temperature.

Series B. Transient T-Phase Eutectic for Hot Tearing Resistance+T-Phase Precipitate Strengthening In certain embodiments, the disclosed alloys are designed to contain a selected percent of soluble T-phase eutectic for hot tearing resistance, and a selected percent T-phase precipitated at a selected temperature for high strength. In certain embodiments, as shown in FIGS. 4-6, the disclosed alloys are designed to contain about 10% of soluble T-phase eutectic for hot tearing resistance, and greater than 6% T-phase, precipitated at about 170° C., for high strength.

In certain embodiments, the alloy comprises, by weight, about 3% zinc, about 4.7% magnesium, about 1.3% copper, about 0.1% zirconium, and the balance of weight percent comprising aluminum and incidental elements and impurities. In certain embodiments, the alloy comprises, by weight, about 3.3% zinc, about 5.5% magnesium, about 1.4% copper, about 0.1% zirconium, and the balance of weight percent comprising aluminum and incidental elements and impurities.

In certain embodiments, the disclosed alloys incorporate $Al_3X$ precipitate phases, where X is Zr, Y, Er, Yb, or Sc. The alloys may incorporate rare earth additions (e.g., Y, Er, Yb, or Sc) to form a reactive dispersion to getter the high oxygen contents inherent to powder-bed AM processes, for refined flaw size and improved toughness and fatigue. In certain embodiments, the disclosed alloys incorporate manganese for iron and silicon gettering. In certain embodiments, the disclosed alloys include silver for enhancing the rate and magnitude of T-phase age hardening.

Series C. η'-Phase Precipitate Strengthening

In certain embodiments, the disclosed alloys are designed to contain above 4% phase, precipitated at a selected temperature for high strength. The solvus temperature of equilibrium η- or T-phase may be less than a selected temperature. The solidification temperature range may be restricted to a maximum temperature. In certain embodiments, the disclosed alloys contain above 4% η-phase, precipitated at about 170° C., for high strength. The solvus temperature of equilibrium η- or T-phase may be less than about 400° C. The solidification temperature range may be a maximum of 170° C.

In certain embodiments, the alloys may comprise, by weight, about 4% to about 9% zinc, about 0.5% to about 3% magnesium, up to about 0.5% copper, up to about 1% zirconium, and the balance of weight percent comprising aluminum and incidental elements and impurities.

In certain embodiments, the disclosed alloys incorporate $Al_3X$ precipitate phases, where X is Zr, Y, Er, Yb, or Sc. The alloys may incorporate rare earth additions (e.g., Y, Er, Yb, or Sc) to form a reactive dispersion to getter the high oxygen contents inherent to powder-bed AM processes, for refined flaw size and improved toughness and fatigue. In certain embodiments, the disclosed alloys incorporate manganese for iron and silicon gettering. In certain embodiments, the disclosed alloys include silver for enhancing the rate and magnitude of T-phase age hardening.

Series D. Ag-Modified T-Phase Strengthened Series

In certain embodiments, the disclosed alloys are designed to contain above 7% T-phase. The solvus temperature may be low for residual stress control. The alloys may have a yield strength of 62 ksi (T7) or greater. The alloys may have a solidification range of <60° C. (processability). In certain embodiments, the alloys may have scandium-free $L1_2$ precipitation based on rare earth to combine oxygen gettering with strengthening phase. In certain embodiments, $L1_2$ precipitation may be based on erbium, ytterbium, or zirconium. The erbium and ytterbium can be used to stabilize $L1_2$ and getter oxygen in to phase (more reactive than aluminum). In certain embodiments, high magnesium reduces lattice misfit, and provide precipitation of T-phase (strength). In certain embodiments, zirconium can be used to increase fraction and reduce lattice misfit (strength, coarsening resistance). Optional scandium can be incorporated into phase for increased strength.

In certain embodiments, the alloy comprises, by weight, about 3.1% magnesium, about 2% silver, about 0.5% copper, about 0.1% zirconium, about 0.4% ytterbium, about 0.4% erbium, and the balance of weight percent comprising aluminum and incidental elements and impurities. In certain embodiments, the alloy comprises, by weight, about 3.1% magnesium, about 2% silver, about 0.5% copper, about 0.1% zirconium, about 0.4% yttrium, and the balance of weight percent comprising aluminum and incidental elements and impurities.

3. ALLOY PROPERTIES

The disclosed aluminum alloys can have one or more desirable properties. For example, the alloys may be amenable to additive manufacturing and the production of various aerospace components. In certain embodiments, the aluminum alloys have hot tear resistance during an additive manufacturing process. In certain embodiments, the aluminum alloys have high strength. In certain embodiments, the aluminum alloys have stress-corrosion cracking resistance. In certain embodiments, the alloys may have a hardness of 184 (HV). The hardness may be measured according to ASTM E384.

4. METHODS OF MANUFACTURING ALUMINUM ALLOYS

The disclosed aluminum alloys can be fabricated into various input stock forms relevant to the additive manufacturing system of interest. One example relevant to powder-bed fusion or directed energy deposition systems includes incorporating primary elements into a homogeneous melt and fabrication into powder form using available atomization techniques such as inert gas atomization. The alloys can also be fabricated into wire form via conventional ingot metallurgy and wire drawing techniques for use in wire-based AM systems.

5. ARTICLES OF MANUFACTURE

The disclosed aluminum alloys can be used to manufacture a variety of articles. Exemplary articles include, but are not limited to, gearbox housings (e.g., helicopter gearbox housing) and aerospace structural components.

6. METHODS OF ADDITIVE MANUFACTURING

The disclosed alloys may be used in various additive manufacturing processes to produce selected articles. Additive manufacturing is a process by which parts are built in a layered fashion by selectively fusing metal using a computer-controlled energy source (e.g., laser, electron beam, weld torch, or the like). In certain embodiments, direct metal laser sintering (DMLS) is used to produce articles comprising the disclosed alloys. Starting with a metal powder, the powder may be spread in a bed ("powder-bed process") and a laser used to selectively melt and fuse regions of the bed. Parts can be built in a layer-by-layer fashion by continually spreading and fusing layers of powder ("build process"). Following a build process, parts may contain defects that preclude use "as-built." For example, the parts can include unacceptable porosity, chemical inhomogeneity, or anisotropy. Various "post-processing" operations can be applied after the build process to eliminate or minimize such defects. Post-processing operations include, but are not limited to, hot isostatic pressing and various heat treatments. Post-processing thermal treatment may stress relieve and/or strengthen one or more portions of the aluminum alloy part. For example, the thermal treatment may result in precipitation hardening of one or more portions of the aluminum alloy part.

In certain embodiments, a method of forming an aluminum alloy component includes subjecting a powdered alloy composition to an additive manufacturing procedure and a subsequent post-processing operation. The alloys can solidify with about 10% of non-equilibrium (soluble) eutectic constituents for improved resistance to hot tearing during additive manufacturing processing. The eutectic constituents can be dissolved during post-processing operations to restore a single-phase aluminum matrix, which can be free of coarse eutectic constituents that were used for hot tearing resistance.

In certain embodiments, a method of forming an aluminum alloy component includes the steps of providing a disclosed alloy composition in a powdered form, providing a three-dimensional design for the component, and subjecting the powdered alloy composition to an additive manufacturing procedure that employs a laser beam. The additive manufacturing procedure can be performed in accordance with the three-dimensional design. Using additive manufacturing processes with the disclosed alloys, the desired alloy microstructure and properties can be generated directly in a component.

7. EXAMPLES

The present disclosure has multiple aspects, illustrated by the following non-limiting examples.

Alloy 1 ("Al-6.3Zn-3.2Mg-1.1Cu-0.1Zr"), Alloy 2 ("Al-7.5Zn-4.6Mg-1.5Cu-0.1Zr"), Alloy 3 ("Al-5.5Mg-3.3Zn-1.4Cu-0.1Zr") and Alloy 4 ("Al-4.7Mg-3Zn-1.3Cu-0.1Zr") were prepared and evaluated. Alloy 5 ("Al-3.1Mg-2Ag-0.5Cu-0.1Zr-0.4Yb-0.4Er") and Alloy 6 ("Al-3.1Mg-2Ag-0.5Cu-0.1Zr-0.4Y") can be prepared by the disclosed methods. Table 1 provides further compositional detail.

TABLE 1

| | Alloy Compositions | | | | | | | | | | | | | | |
| --- | --- | --- | --- | --- | --- | --- | --- | --- | --- | --- | --- | --- | --- | --- | --- |
| Alloy | Al | Cu | Mg | Zn | Zr | Ag | Er | Y | Yb | Si | Cr | Sc | Mn | Fe | Ni |
| Alloy 1 | Bal. | 1.1 | 3.2 | 6.3 | 0.1 | | | | | | | | | | |
| Alloy 2 | Bal. | 1.5 | 4.6 | 7.5 | 0.1 | | | | | | | | | | |
| Alloy 3 | Bal. | 1.4 | 5.5 | 3.3 | 0.1 | | | | | | | | | | |
| Alloy 4 | Bal. | 1.3 | 4.7 | 3 | 0.1 | | | | | | | | | | |
| Alloy 5 | Bal. | 0.5 | 3.1 | | 0.1 | 2 | 0.4 | | 0.4 | | | | | | |
| Alloy 6 | Bal. | 0.5 | 3.1 | | 0.1 | 2 | | 0.4 | | | | | | | |
| 6061 | Bal. | 0.15-0.4 | 0.8-1.2 | 0-0.25 | | | | | | 0.4-0.8 | 0.04-0.35 | | 0-0.15 | 0-0.7 | |
| 7075 | Bal. | 1.2-2 | 2.1-2.9 | 5.1-6.1 | | | | | | 0-0.4 | 0.18-0.28 | | 0-0.3 | 0-0.5 | |
| AlSi10Mg | Bal. | 0-0.05 | 0.2-0.45 | 0-0.1 | | | | | | 9-11 | | | 0-0.045 | 0-0.55 | 0-0.05 |

Weld Crack Sensitivity Study

A study was performed to assess weld crack sensitivity ahead of atomization and direct metal laser sintering (DMLS). Bead-on-plate welding trials were performed in an EOS M280 DMLS machine as a proxy experiment of additive manufacturing processability, with the goal of evaluating hot cracking resistance and hardness (processability and performance metrics) before obtaining powders to do DMLS trials.

Figure 7:
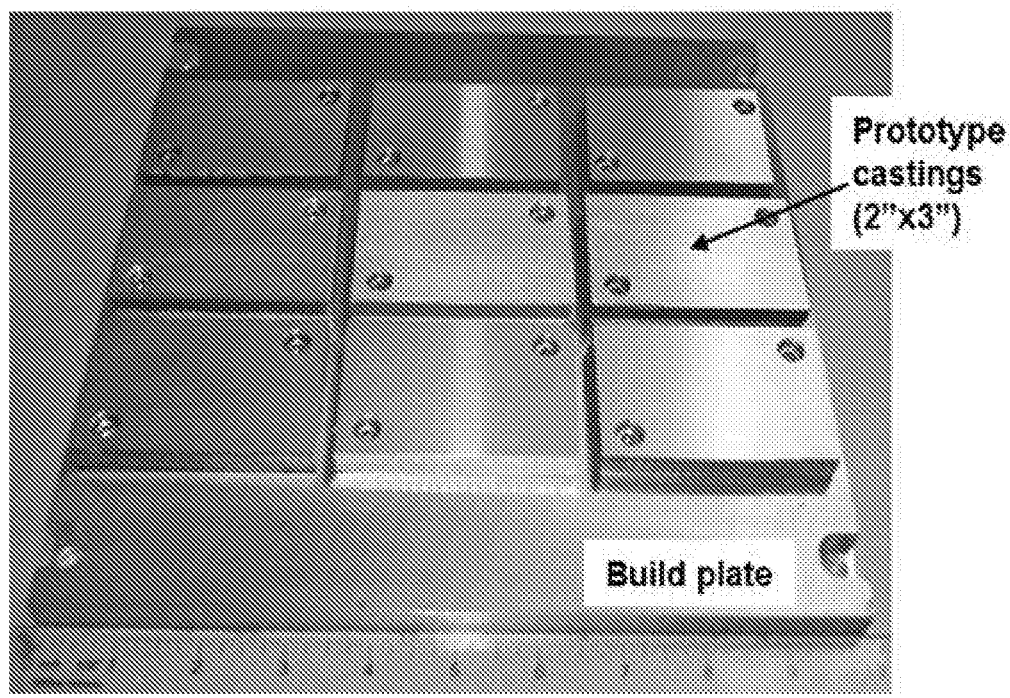
FIG. 7 shows an EOS M280 DMLS build plate assembly for use in the bead-on-plate weld crack sensitivity study. Nine prototype plate castings are shown fixtured to the build plate—six prototype alloys and baseline alloys AlSi10Mg, 6061 and 7050.
Figure 8:
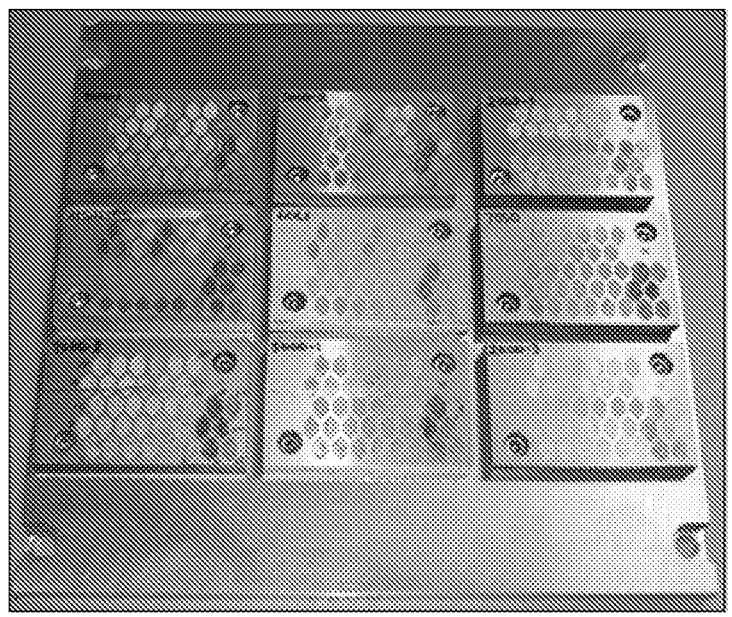
FIG. 8 shows the weld crack sensitivity study build plate assembly after DMLS weld trials have been applied to each prototype plate casting.
Figure 9:
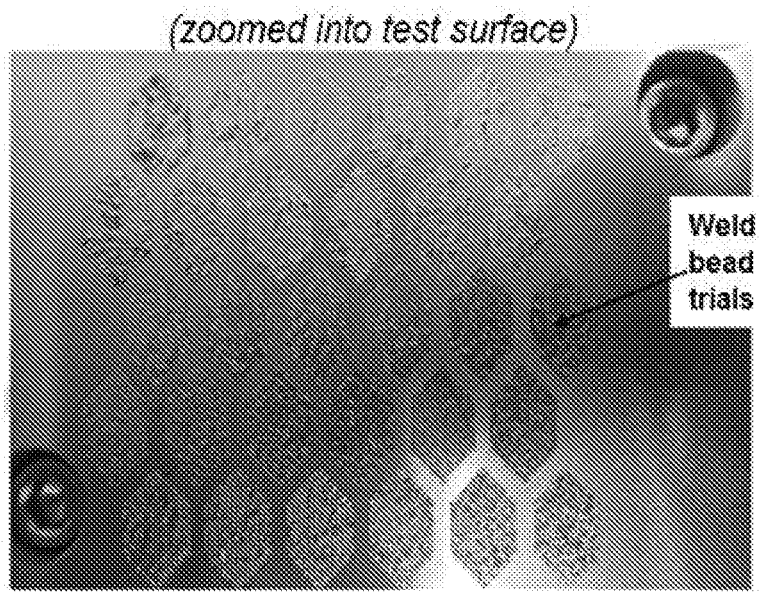
FIG. 9 shows a magnification of an example prototype plate casting after the bead-on-plate weld crack sensitivity study, showing detail of the 30 individual weld patterns applied to the plate, each with different laser scan parameters.
Figure 10A:
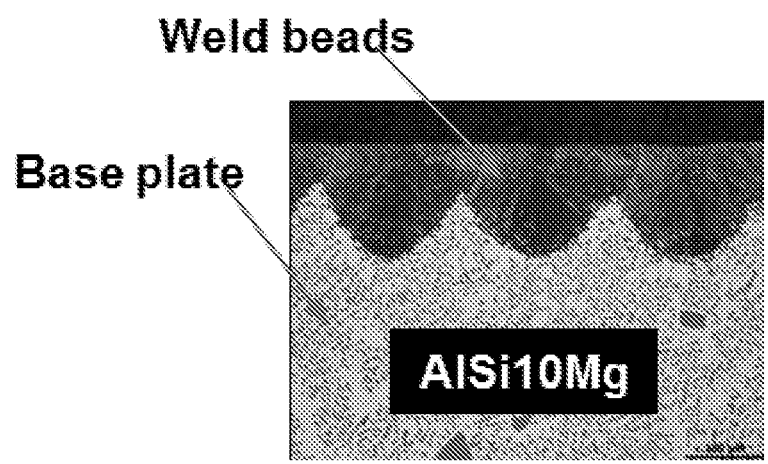
FIG. 10A shows an example micrograph of a cross-section through a bead-on-plate weld pattern for the AlSi10Mg baseline alloy. Microstructure of the weld revealed by microetching with Keller's Reagent. Weld shows no evidence of solidification hot tearing, consistent with the known laser weldability and AM processability of this alloy.
Figure 10B:
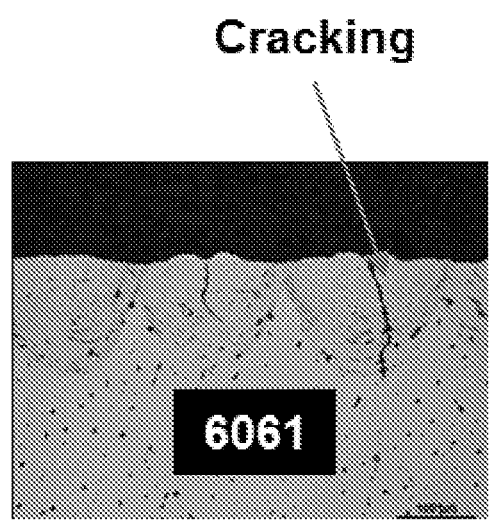
FIG. 10B shows an example micrograph of a cross-section through a bead-on-plate weld pattern for the 6061 baseline alloy. Microstructure of the weld revealed by microetching with Keller's Reagent. Weld shows significant solidification hot tearing, consistent with the poor laser weldability and AM processability of this high-strength alloy as demonstrated in Fulcher, B A., et al., *In Proc. Solid Freeform Fabrication (SFF) Symposium*, 404-419 (2014).
Figure 10C:
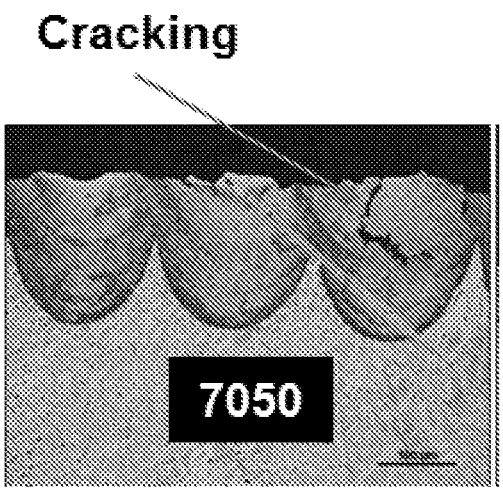
FIG. 10C shows an example micrograph of a cross-section through a bead-on-plate weld pattern for the 7050 baseline alloy. Microstructure of the weld revealed by microetching with Keller's Reagent. Weld shows significant solidification cracking, consistent with the poor resistance to hot tearing of this high-strength alloy class.
Figure 10D:
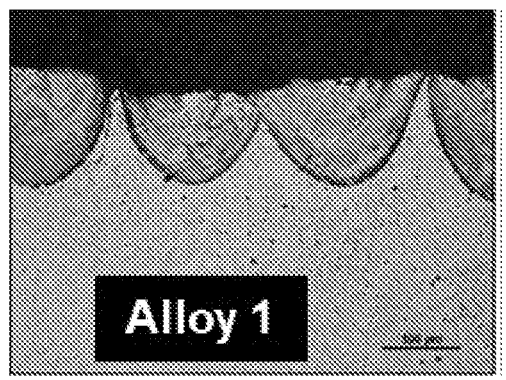
FIG. 10D shows an example micrograph of a cross-section through a bead-on-plate weld pattern for an Al-6.3Zn-3.2Mg-1.1Cu-0.1Zr concept alloy. Microstructure of the weld revealed by microetching with Keller's Reagent. Weld shows no evidence of cracking, validating the resistance to hot tearing that is necessary for good laser weldability and AM processability of this alloy.
Figure 10E:
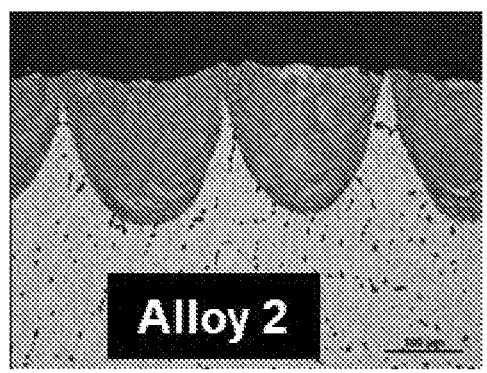
FIG. 10E shows an example micrograph of a cross-section through a bead-on-plate weld pattern for an Al-7.5Zn-4.6Mg-1.5Cu-0.1Zr concept alloy. Microstructure of the weld revealed by microetching with Keller's Reagent. Weld shows no evidence of cracking, validating the resistance to hot tearing that is necessary for good laser weldability and AM processability of this alloy.
Figure 10F:
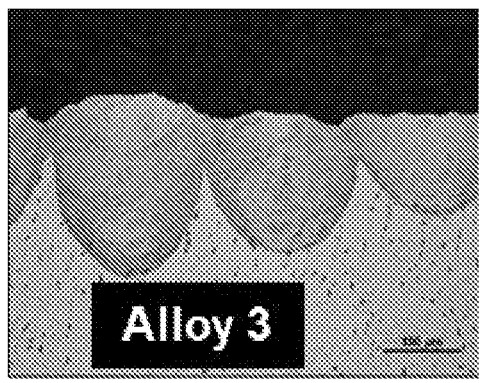
FIG. 10F shows an example micrograph of a cross-section through a bead-on-plate weld pattern for an Al-5.5Mg-3.3Zn-1.4Cu-0.1Zr concept alloy. Microstructure of the weld revealed by microetching with Keller's Reagent. Weld shows no evidence of cracking, validating the resistance to hot tearing that is necessary for good laser weldability and AM processability of this alloy.

Alloys 1-4 as well as comparison alloys (AlSi10Mg, 6061, and 7050) were cast, homogenized, machined, and bolted to a test plate (FIG. 7), and subsequently inserted into an EOS M280 DMLS machine. Various laser welding conditions were applied to each plate (FIG. 8 and FIG. 9). The plates were subsequently sectioned and analyzed for microstructure. Segments of each plate were separately heat treated and hardness measured to demonstrate achievable hardness. Hardness was tested at locations away from the welding regions. Materials were heat treated to T6 (AlSi10Mg and 6061) or T7 (7050, Alloys 1-4) in accordance with standard conditions for each alloy class.

As shown in FIGS. 10A-10F, Alloys 1-3 exhibited successful elimination of hot cracking in comparison to common aircraft structural alloys 6061 and 7050. Alloy 4 was removed from this experiment because it was improperly heat treated. As shown in Table 2, Alloys 1-4 show improved hardness. Thus, the disclosed alloys successfully eliminate hot cracking, coupled with a high precipitation hardening response. The alloys exhibit improved processability compared to 6061 and 7050, and improved performance compared to AlSi10Mg.

TABLE 2

| | Average Hardness | |
|---|---|---|
| Alloy | Average Hardness (Vicker's Hardness Number) | Cracking Observed? |
| AlSiMg-T6 | 105 | No |
| 6061-T6 | 124 | Yes |
| 7050-T7 | 172 | Yes |
| Alloy 1 (T7) | 183 | No |
| Alloy 2 (T7) | 184 | No |
| Alloy 3 (T7) | 168 | No |
| Alloy 4 (T7) | 165 | No |

T6 = Solution heat treated then artificially aged;
T7 = Solution heat treated then overaged/stabilized.

DMLS Evaluations

Figure 11:
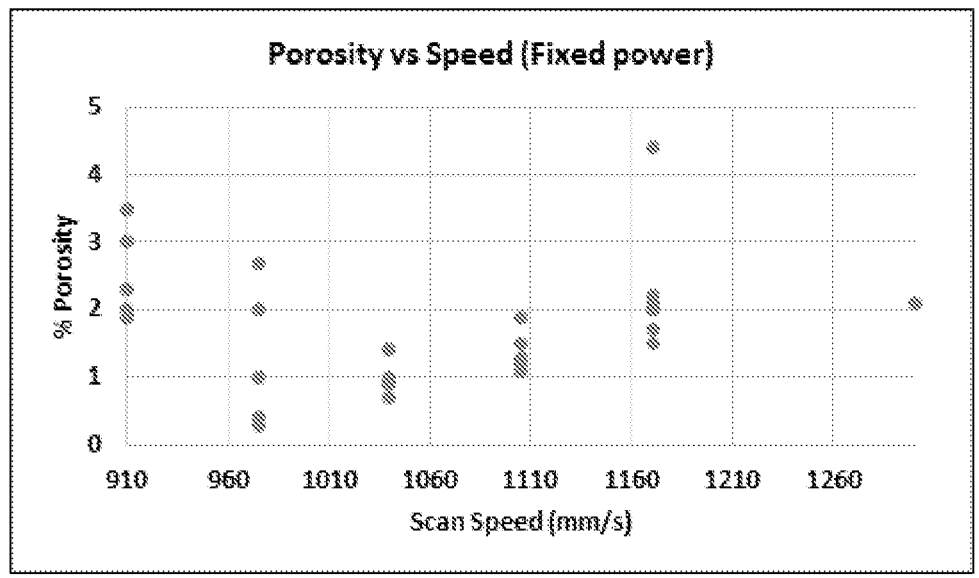
FIG. 11 shows measured porosity vs. scan speed from the DMLS process trials for Alloy 4.
Figure 12:
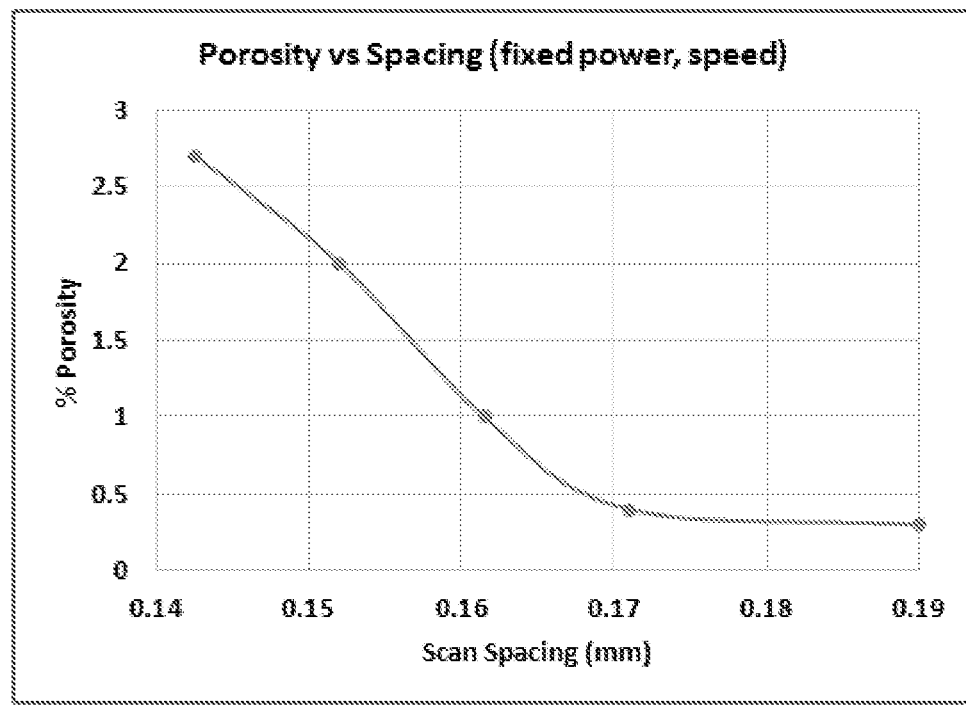
FIG. 12 shows measured porosity vs. scan spacing from the DMLS process trials for Alloy 4.

Alloy 4 was selected for powder manufacturing and DMLS processing. A 20-63 micron powder distribution of Alloy 4 was prepared by gas atomization (argon) on a 200 kg scale. The powder was used in DMLS processing (EOS M280 DMLS machine) to establish the effects of process variables on density and microstructure. As shown in FIG. 11 and FIG. 12, medium-high power and slow-to-medium speed provides crack free and dense builds.

Figure 13:
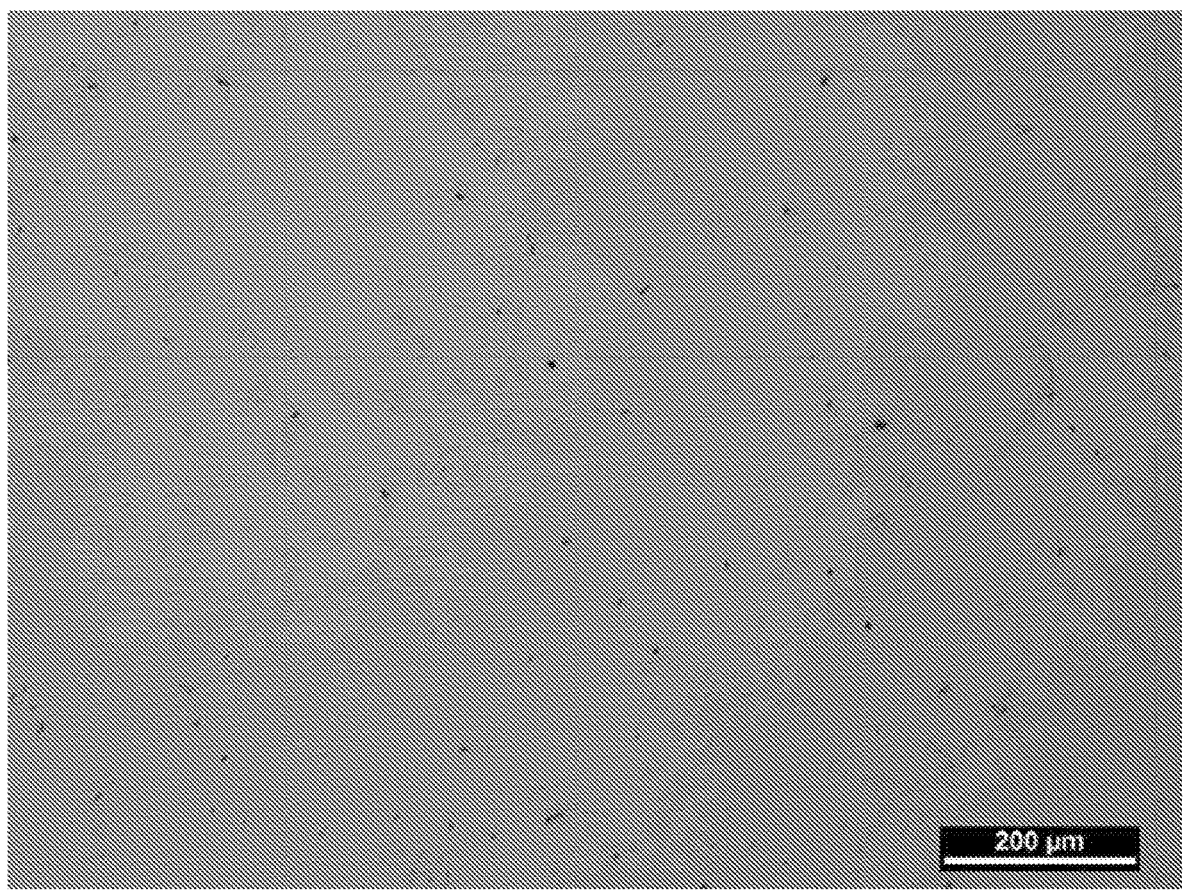
FIG. 13 shows an as-polished micrograph of an Al-4.7Mg-3Zn-1.3Cu-0.1Zr alloy build processed by the DMLS process (EOS M280 system) in the as-built condition, demonstrating a crack-free microstructure with a low level of porosity.
Figure 14:
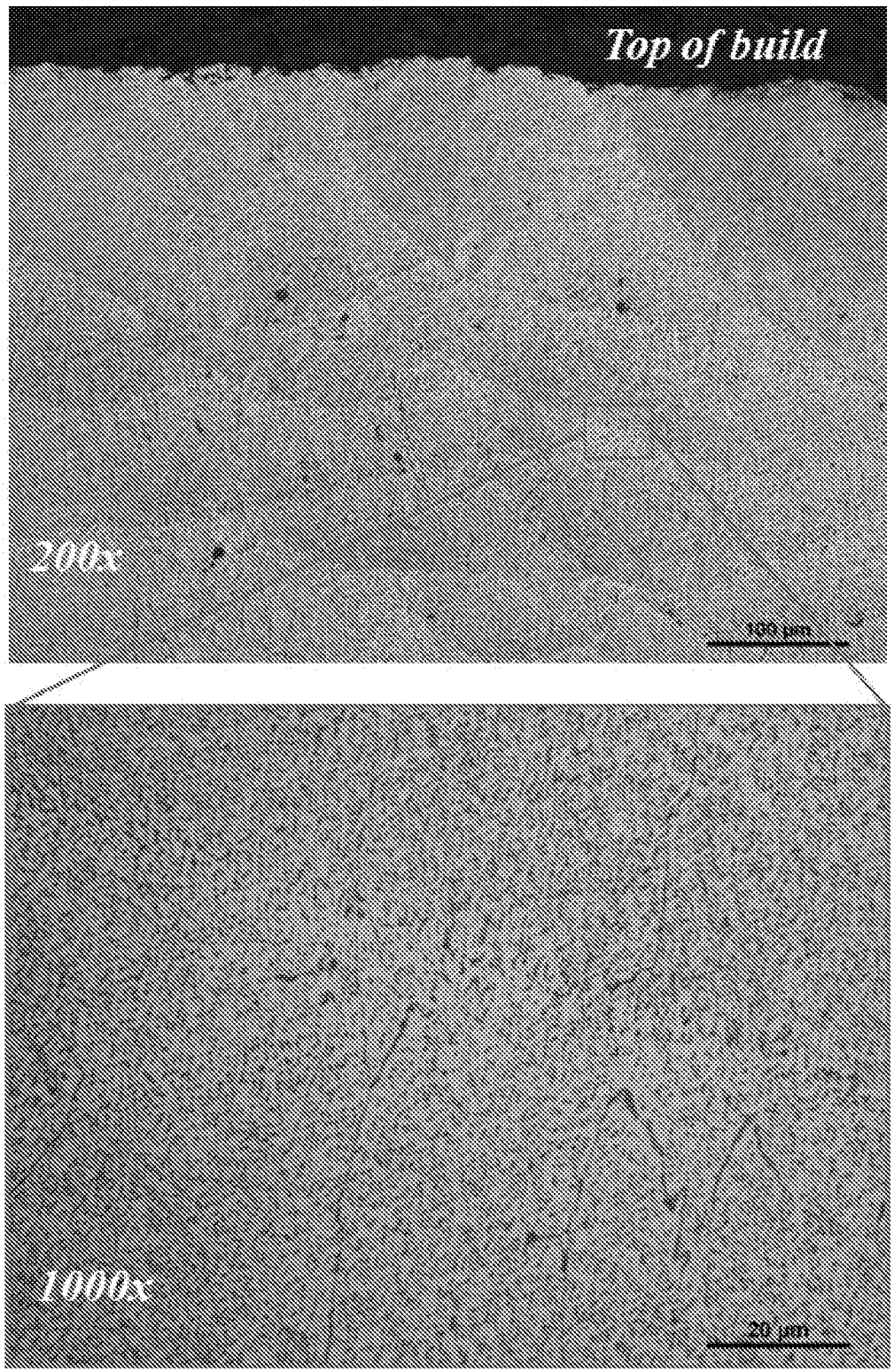
FIG. 14 shows two micrographs at differing magnifications of an Al-4.7Mg-3Zn-1.3Cu-0.1Zr alloy build processed by the DMLS process (EOS M280 system) and in the as-built condition, etched in Keller's Reagent to reveal microstructural constituents. Etching reveals a high fraction of eutectic solidification constituents in the as-built condition.

FIG. 13 and FIG. 14 show the clean as-built microstructure of the alloy after DMLS processing. FIG. 13 shows a microstructure with <0.5% porosity, average pore size of ~10 µm, and free of coarse oxide dispersions/films. FIG. 14 shows the presence of a designed eutectic phase with discrete eutectic particles of ~0.2 µm diameter.

Figure 15:
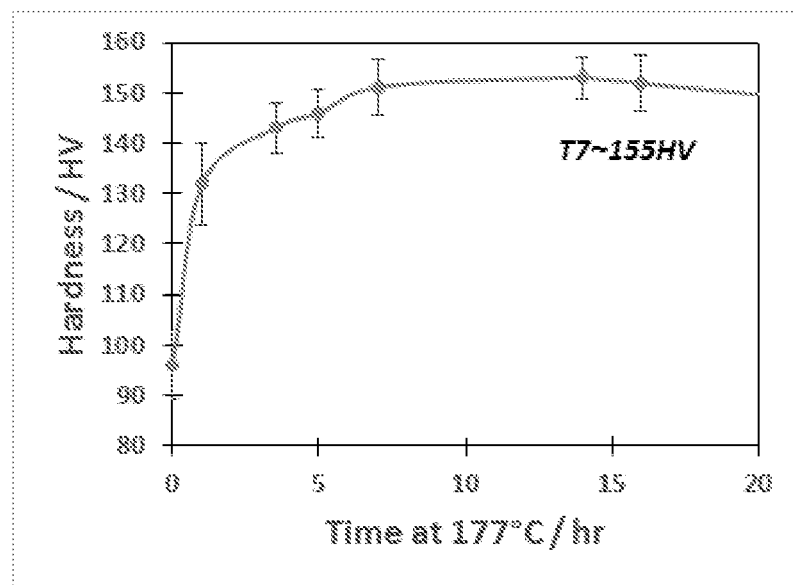
FIG. 15 shows the age hardening response for an Al-4.7Mg-3Zn-1.3Cu-0.1Zr alloy after DMLS processing. Samples are in an as-built and post-process solutionized and water quenched condition, prior to isothermal aging at 177 C for various times (0-24 hours). Hardness measured by microindentation (Vickers hardness) in accordance with ASTM E384.
Figure 16:
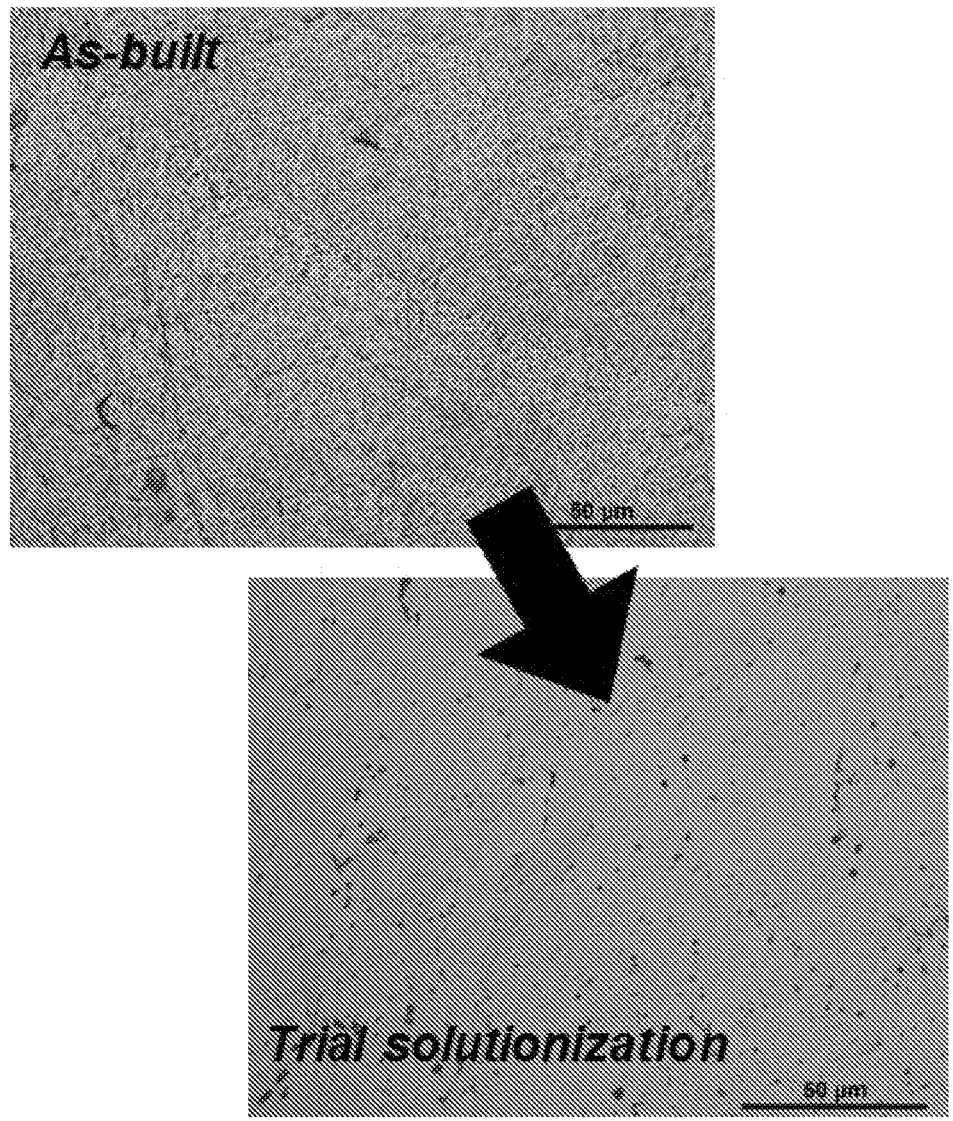
FIG. 16 shows etched micrographs of an Al-4.7Mg-3Zn-1.3Cu-0.1Zr alloy build processed by the DMLS process (EOS M280 system), comparing the microstructure in the as-built condition to that after post-process solutionizing at 480 C for 1 hour. Etching reveals a high fraction of fine eutectic solidification constituents in the as-built condition, which are largely dissolved during the post-process solutionization, validating the design concepts.

FIG. 15 and FIG. 16 show the results of post-process response studies with Alloy 4. Initial post-processing trials demonstrated that the alloys are solution treatable and have a strong precipitate aging response. FIG. 15 shows a 50% improvement in T7 (overage) hardness over DMLS-AlSi10Mg-T6. FIG. 16 shows that transient eutectic dissolves during post-solutionization and recrystallization to ASTM<6.

8. EXEMPLARY EMBODIMENTS

For reasons of completeness, various aspects of the disclosure are set out in the following numbered clauses:

Clause 1. An aluminum alloy for additive manufacturing, wherein the aluminum alloy can solidify with about 10% of non-equilibrium (soluble) eutectic constituents for improved resistance to hot tearing during additive manufacturing processing, and wherein the eutectic constituents can be dissolved during post-processing operations to restore a single-phase aluminum matrix, which can be free of coarse eutectic constituents that were used for hot tearing resistance.

Clause 2. The alloy of clause 1, containing about 10% of soluble T-phase eutectic for hot tearing resistance during additive manufacturing processing, and greater than 6% η'-phase, precipitated at about 170° C., for high strength.

Clause 3. The alloy of clause 1, containing about 10% of soluble T-phase eutectic for hot tearing resistance during additive manufacturing processing, and greater than 6% T-phase, precipitated at about 170° C., for high strength.

Clause 4. The alloy of clause 1, containing above 4% η-phase, precipitated at a selected temperature for high strength.

Clause 5. An alloy, comprising, consisting essentially of, or consisting of, by weight, about 3% to about 9% zinc, about 2% to about 6% magnesium, about 0.5% to about 2% copper, 0% to about 1% zirconium, 0% to about 2% yttrium, 0% to about 2% erbium, 0% to about 2% ytterbium, 0% to about 2% scandium, 0% to about 2% silver, and 0% to about 2% manganese, the balance essentially aluminum and incidental elements and impurities. For example, an alloy comprising, consisting essentially of, or consisting of, by weight: 3%, 4%, 5%, 6%, 7%, 8%, or 9% zinc; 2%, 3%, 4%, 5%, or 6% magnesium; 0.5%, 1%, 1.5%, or 2% copper; 0%, 0.05%, 0.1%, 0.5%, or 1% zirconium; 0%, 0.5%, 1%, 1.5%, or 2% of yttrium; 0%, 0.5%, 1%, 1.5%, or 2% of erbium; 0%, 0.5%, 1%, 1.5%, or 2% of ytterbium; 0%, 0.5%, 1%, 1.5%, or 2% of scandium; 0%, 0.5%, 1%, 1.5%, or 2% of silver; 0%, 0.5%, 1%, 1.5%, or 2% of manganese; and the balance essentially aluminum and incidental elements and impurities.

Clause 6. The alloy of clause 5, comprising about 0.1% zirconium.

Clause 7. The alloy of clause 5, comprising, consisting essentially of, or consisting of, by weight, about 6.3% zinc, about 3.5% magnesium, about 1.1% copper, about 0.1% zirconium, and the balance of weight percent comprising aluminum and incidental elements and impurities.

Clause 8. The alloy of clause 5, comprising, consisting essentially of, or consisting of, by weight, about 7.5% zinc, about 4.6% magnesium, about 1.5% copper, about 0.1% zirconium, and the balance of weight percent comprising aluminum and incidental elements and impurities.

Clause 9. The alloy of clause 5, comprising, consisting essentially of, or consisting of, by weight, about 3% zinc, about 4.7% magnesium, about 1.3% copper, about 0.1% zirconium, and the balance of weight percent comprising aluminum and incidental elements and impurities.

Clause 10. The alloy of clause 5, comprising, consisting essentially of, or consisting of, by weight, about 3.3% zinc, about 5.5% magnesium, about 1.4% copper, about 0.1% zirconium, and the balance of weight percent comprising aluminum and incidental elements and impurities.

Clause 11. The alloy of clause 5, wherein the disclosed alloys incorporate one or more Al$_3$X precipitate phases, where X is Zr, Y, Er, Yb, or Sc.

Clause 12. An alloy, comprising, consisting essentially of, or consisting of, by weight, about 4% to about 9% zinc, about 0.5% to about 3% magnesium, up to about 0.5% copper, up to about 1% zirconium, and the balance of weight percent comprising aluminum and incidental elements and impurities. For example, an alloy comprising, consisting essentially of, or consisting of, by weight: 4%, 5%, 6%, 7%, 8%, or 9% zinc; 0.5%, 1%, 1.5%, 2%, 2.5%, or 3% magnesium; 0%, 0.05%, 0.1%, or 0.5% copper; 0%, 0.05%, 0.1%, 0.5%, or 1% zirconium; and the balance essentially aluminum and incidental elements and impurities.

Clause 13. An alloy, comprising, consisting essentially of, or consisting of, by weight, about 3.1% magnesium, about 2% silver, about 0.5% copper, about 0.1% zirconium, about 0.4% ytterbium, about 0.4% erbium, and the balance of weight percent comprising aluminum and incidental elements and impurities.

Clause 14. An alloy, comprising, consisting essentially of, or consisting of, by weight, about 3.1% magnesium, about 2% silver, about 0.5% copper, about 0.1% zirconium, about 0.4% yttrium, and the balance of weight percent comprising aluminum and incidental elements and impurities.

Clause 15. An aluminum alloy according to any of clauses 1-14 for additive manufacturing, wherein the aluminum alloy can solidify with about 10% of non-equilibrium (soluble) eutectic constituents for improved resistance to hot tearing during additive manufacturing processing, and wherein the eutectic constituents can be dissolved during post-processing operations to restore a single-phase aluminum matrix, which can be free of coarse eutectic constituents that were used for hot tearing resistance.

Clause 16. The alloy according to any one of clauses 1-15, containing about 10% of soluble T-phase eutectic for hot tearing resistance during additive manufacturing processing, and greater than 6% η'-phase, precipitated at about 170° C., for high strength.

Clause 17. The alloy according to any one of clauses 1-15, containing about 10% of soluble T-phase eutectic for hot tearing resistance during additive manufacturing processing, and greater than 6% T-phase, precipitated at about 170° C., for high strength.

Clause 18. The alloy according to any one of clauses 1-15, containing above 4% η-phase, precipitated at a selected temperature for high strength.

Clause 19. A manufactured article comprising an alloy according to any of clauses 1-18.

Clause 20. A method of preparing an article through additive manufacturing, comprising: subjecting a powdered alloy composition according to any one of clauses 1-18 to an additive manufacturing procedure and a subsequent post-processing operation.

Clause 21. The method of clause 20, wherein the alloy can solidify with about 10% of non-equilibrium (soluble) eutectic constituents for improved resistance to hot tearing during additive manufacturing processing.

Clause 22. The method of clause 20 or clause 21, wherein the eutectic constituents can be dissolved during post-processing operations to restore a single-phase aluminum matrix, which can be free of coarse eutectic constituents that were used for hot tearing resistance.

Clause 23. The method of any one of clauses 20-22, wherein the post-processing operation comprises a thermal treatment.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. An aluminum alloy for additive manufacturing, the aluminum alloy consisting of, by weight,
   about 3% to about 9% zinc,
   3% to about 6% magnesium,
   1% to about 2% copper,
   0% to about 1% zirconium,
   0% to about 2% yttrium,
   0% to about 2% erbium,
   0% to about 2% ytterbium,
   0% to about 2% silver, and
   0% to about 2% manganese,
   the balance aluminum and incidental elements and impurities,
   wherein the aluminum alloy can solidify with about 10% of non-equilibrium (soluble) eutectic constituents for improved resistance to hot tearing during additive manufacturing processing, and wherein the eutectic constituents can be dissolved during post-processing operations to restore a single-phase aluminum matrix, which can be free of coarse eutectic constituents that were used for hot tearing resistance.

2. The alloy of claim 1, containing about 10% of soluble T-phase eutectic for hot tearing resistance during additive manufacturing processing, and greater than 6% η'-phase, precipitated at about 170° C., for high strength.

3. The alloy of claim 1, containing about 10% of soluble T-phase eutectic for hot tearing resistance during additive manufacturing processing, and greater than 6% T-phase, precipitated at about 170° C., for high strength.

4. The alloy of claim 1, containing above 4% η-phase, precipitated at a selected temperature for high strength.

5. An alloy, consisting of, by weight,
   about 3% to about 9% zinc,
   3% to about 6% magnesium,
   1% to about 2% copper,
   0% to about 1% zirconium,
   0% to about 2% yttrium,
   0% to about 2% erbium,
   0% to about 2% ytterbium,
   0% to about 2% silver, and
   0% to about 2% manganese,
   the balance aluminum and incidental elements and impurities.

6. The alloy of claim 5, wherein zirconium is present at 0.1 weight %.

7. The alloy of claim 5, consisting of, by weight, about 6.3% zinc, about 3.5% magnesium, about 1.1% copper, about 0.1% zirconium, and the balance of weight percent aluminum and incidental elements and impurities.

8. The alloy of claim 5, consisting of, by weight, about 7.5% zinc, about 4.6% magnesium, about 1.5% copper, about 0.1% zirconium, and the balance of weight percent aluminum and incidental elements and impurities.

9. The alloy of claim 5, consisting of, by weight, about 3% zinc, about 4.7% magnesium, about 1.3% copper, about 0.1% zirconium, and the balance of weight percent aluminum and incidental elements and impurities.

10. The alloy of claim 5, consisting of, by weight, about 3.3% zinc, about 5.5% magnesium, about 1.4% copper, about 0.1% zirconium, and the balance of weight percent aluminum and incidental elements and impurities.

11. The alloy of claim 5, wherein the disclosed alloys incorporate one or more $Al_3X$ precipitate phases, where X is Zr, Y, Er, Yb, or Sc.

12. An alloy, consisting of, by weight,
about 4% to about 9% zinc,
about 0.5% to 2% magnesium,
up to about 0.5% copper,
0.5% to about 1% zirconium,
and the balance of weight percent aluminum and incidental elements and impurities.

13. An alloy, consisting of, by weight,
about 3.1% magnesium,
about 2% silver,
about 0.5% copper,
about 0.1% zirconium,
about 0.4% ytterbium,
about 0.4% erbium,
and the balance of weight percent aluminum and incidental elements and impurities.

14. An alloy, consisting of, by weight,
about 3.1% magnesium,
about 2% silver,
about 0.5% copper,
about 0.1% zirconium,
about 0.4% yttrium,
and the balance of weight percent aluminum and incidental elements and impurities.

15. A method of preparing an article through additive manufacturing, comprising:
subjecting a powdered alloy composition to an additive manufacturing procedure and a subsequent post-processing operation, wherein the alloy comprises, by weight,
about 3% to about 9% zinc,
about 0.5% to about 2% magnesium,
less than about 0.5% copper,
0.5% to about 2% zirconium,
1% to about 2% erbium,
less than 0.01% scandium, and
0% to about 2% manganese,
the balance aluminum and incidental elements and impurities.

16. The method of claim 15, wherein the alloy can solidify with about 10% of non-equilibrium (soluble) eutectic constituents for improved resistance to hot tearing during additive manufacturing processing.

17. The method of claim 16, wherein the eutectic constituents can be dissolved during post-processing operations to restore a single-phase aluminum matrix, which can be free of coarse eutectic constituents that were used for hot tearing resistance.

18. The method of claim 15, wherein the post-processing operation comprises a thermal treatment.

19. An alloy, comprising, by weight,
about 3% to about 9% zinc;
about 0.5% to about 2% magnesium;
0.5% to about 2% zirconium;
1% to about 2% erbium;
less than about 0.5% copper;
less than 0.01% scandium;
and the balance of weight percent comprising aluminum and incidental elements and impurities.

20. The alloy according to claim 19, comprising, by weight, 0% copper.

21. The alloy according to claim 20, comprising, by weight,
about 6% to about 8% zinc;
1% to 2% magnesium; and
0.5% to 1.5% zirconium.

22. A manufactured article comprising an alloy according to claim 19.

* * * * *

UNITED STATES PATENT AND TRADEMARK OFFICE
CERTIFICATE OF CORRECTION

PATENT NO. : 10,941,473 B2  
APPLICATION NO. : 15/757163  
DATED : March 9, 2021  
INVENTOR(S) : David R. Snyder et al.

It is certified that error appears in the above-identified patent and that said Letters Patent is hereby corrected as shown below:

In the Specification

Column 1, Line 13, delete "This invention was made with government support under Contract Nos. N00014-14-P-1137 and N00014-15-P-0158, awarded by the U.S. Department of Defense. The government has certain rights in this invention." and insert -- "This invention was made with Government support under N68335-17-C-0206 awarded by the Department of the Navy. The Government has certain rights in this invention." --

Signed and Sealed this  
Twenty-second Day of August, 2023

Katherine Kelly Vidal  
*Director of the United States Patent and Trademark Office*